July 5, 1938.  A. B. BRUCE  2,122,678
BRAKE MECHANISM
Filed April 24, 1937
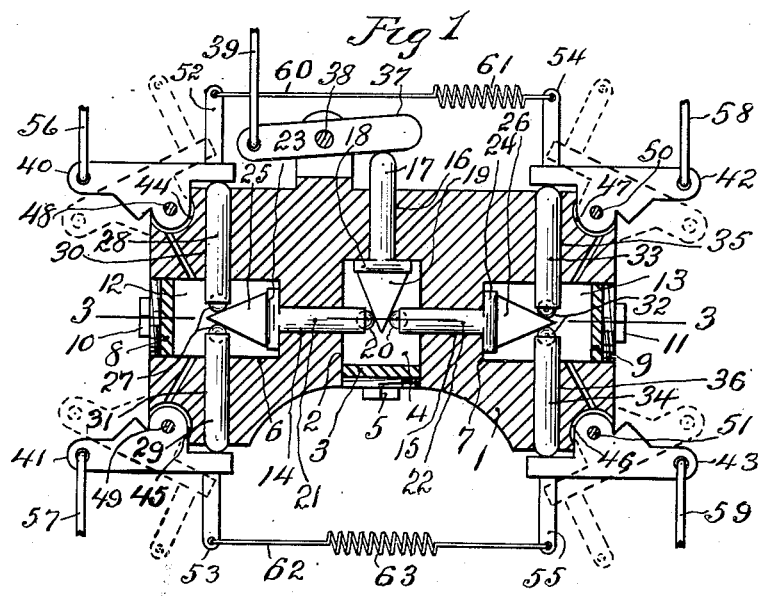
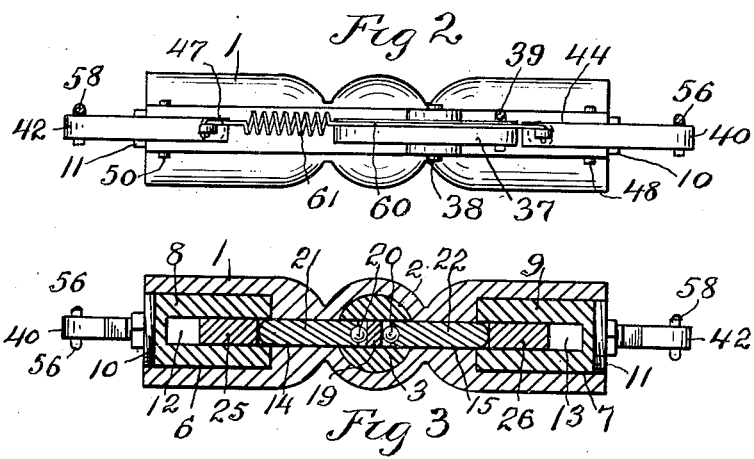
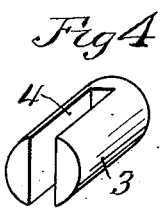 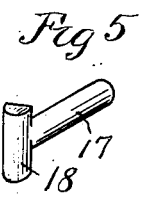 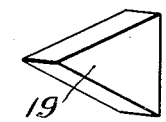
INVENTOR.
Alvin B. Bruce
BY Warren D House
His ATTORNEY.

Patented July 5, 1938

2,122,678

UNITED STATES PATENT OFFICE 2,122,678

BRAKE MECHANISM

Alvin B. Bruce, Kansas City, Mo.

Application April 24, 1937, Serial No. 138,756

3 Claims. (Cl. 188—204)

My invention relates to improvements in brake mechanism.

One of the objects of my invention is to provide a novel brake mechanism of the kind described which will apply the brakes with equal pressure to all of the wheels.

A further object of my invention is the provision of a novel brake mechanism, which is simple, cheap, strong, durable, not likely to get out of order, which can be quickly and easily applied to car brakes of the type now in use, and which is efficient in its operation.

The novel features of my invention are hereinafter fully described and claimed.

In the accompanying drawing, which illustrates the preferred embodiment of my invention, Fig. 1 is a top view, partly in horizontal section, of my improved brake mechanism.

Fig. 2 is an end view of the same, looking from the front.

Fig. 3 is a section on line 3—3 of Fig. 1.

Fig. 4 is a perspective view of one of the cylindrical wedge supports.

Fig. 5 is a perspective view of one of the wedge operating members.

Fig. 6 is a perspective view of one of the wedges, enlarged.

Similar characters of reference designate similar parts in the different views.

1 designates a support for the operative parts, which is, preferably of cast metal, such as brass or steel, and which is mounted on the chassis, not shown of the car to which the brake mechanism is to be applied.

On the middle portion of the support 1, extending forwardly from the rear edge thereof is a cylindrical hole 2 in which is mounted a cylindrical bearing 3.

The bearing 3 has an axial slot 4 extending rearwardly from its front end and disposed horizontally. The rear end of the hole 2 is threaded and has fitted removably in it a screw plug 5 which holds the bearing 3 in operative position.

Similar holes 6 and 7 extend horizontally inwardly in the support 1 from opposite edges thereof, and have respectively mounted in them, cylindrical bearings 8 and 9, which are held in the support respectively by screw plugs 10 and 11. The bearings 8 and 9, like the bearing 3, have respectively extending from their inner ends slots 12 and 13.

The inner ends of the holes 6 and 7 are respectively connected with the hole 2 with horizontal alined holes 14 and 15 which also aline with the slots 4, 12 and 13. Extending from the front end of the hole 2 and slot 4 to the front end of the support 1 is a hole 16, in which is fitted a forwardly and rearwardly slidable stem portion of a member 17, the rear end of which, in the slot 4, is provided with a head 18 which bears against the front edge of a master wedge 19, of flat form, and forwardly and rearwardly slidable, as well as laterally, in the slot 4.

The rear bevelled end portion of the triangular wedge 19 is disposed between and is movable laterally, in the slot 4, with two anti-friction balls 20 respectively mounted in the inner ends of two alined transverse members 21 and 22 respectively longitudinally slidable in the holes 6 and 7. The outer ends of the members 21 and 22 are respectively provided with heads 23 and 24 respectively mounted in the slots 12 and 13 and respectively bearing against the inner ends of two auxiliary wedges 25 and 26 respectively inwardly and outwardly slidable, as well as laterally, in the slots 12 and 13.

The outer end of the wedge 25 is between and engages two balls 27 respectively mounted in the inner ends of two alined members 28 and 29 respectively slidable in two holes 30 and 31, which extend respectively from the front and rear ends of the support 1 to the hole 6 and slot 12.

The outer end of the wedge 26 is between and engages two balls 32 respectively mounted in the inner ends of two alined members 33 and 34 respectively slidable in two holes 35 and 36 which extend respectively from the front and rear ends of the support 1 to the hole 7 and slot 13.

A horizontal lever 37 is pivoted by a vertical pin 38 to the front end of the support 1, and bears at one side of the pin 38 on the front end of the member 17. To the lever 37 at the other side of the pin 38 is pivoted the rear end of a brake rod 39, shown broken away, which extends forwardly and connects in the usual manner to the usual pedal or hand lever, not shown, used in setting the brakes. When the rod 39 is pulled forwardly to set the brakes, it swings the lever 37 so as to force rearwardly the member 17, thereby forcing rearwardly the master wedge 19.

The outer ends of the members 28, 29, 33 and 34 respectively bear against four levers 40, 41, 42 and 43, respectively pivoted in corner recesses 44, 45, 46 and 47 in the support 1, by vertical pins 48, 49, 50 and 51. The levers 40, 41, 42 and 43 are respectively provided with arms 52, 53, 54 and 55.

The levers 40, 41, 42 and 43 have respectively pivoted to them brake connecting means comprising four rods 56, 57, 58 and 59, which constitute connecting means for respectively setting, in the usual manner, the four brakes of a car. The rods are partly broken away, and the brakes of usual type are not shown.

Connecting the arms 52 and 54 is a rod 60 which includes a coil spring 61, the tension of the spring normally swinging the arms 52 and 54 so as to cause the levers 40 and 42 to retract inwardly from the outward braking position the members 28 and 33.

Connecting the arms 53 and 55 is a rod 62 which includes a coil spring 63, the tension of which normally swings the arms 53 and 55 to cause the levers 41 and 43 to retract inwardly the members 29 and 34.

When the brake pedal rod 39 is operated to set the brakes, the lever 37 through the member 17 will force rearwardly the master wedge 19, thus forcing outwardly the members 21 and 22, which in turn outwardly force the auxiliary wedges 25 and 26 to the braking position. The wedges 25 and 26 in turn will force outwardly respectively the two pairs of slidable members 28—29 and 33—34, thereby swinging the levers 40, 41, 42 and 43 to the braking, shown in dotted lines in Fig. 1 and setting the brakes through the rods 56, 57, 58 and 59.

The rods 56 and 58 connect with the left and right front brakes, and the rods 57 and 59 connect with the rear brakes.

As the wedges 19, 25 and 26 are laterally slidable in the slots 4, 12 and 13, as well as inwardly and outwardly movable, they are movable laterally with the members which they force apart. By reason of this construction, no one of the brakes will be set until all are set, and each brake will have applied to it the same braking pressure. The members 21 and 22, wedges 25 and 26, members 28, 29, 33 and 34, and the levers 40, 41, 42 and 43 thus form equalizing means between the wedge 19 and the connecting means constituting the rods 56, 57, 58 and 59 by which the latter apply the four brakes with equal pressure in the braking operation.

When the manually controlled means, as the brake pedal, the brake lever or other instrumentality for setting the brakes is released, the springs 61 and 63, through the rods 60 and 62, will, as has been explained hereinbefore, operate to retract the moving parts to their initial non-braking positions.

Various modifications of my invention, within the scope of the appended claims, may be made, without departing from the spirit of my invention.

What I claim is:—

1. In a brake mechanism having two brakes for two wheels and having two connecting means for respectively setting said brakes, the combination with said connecting means, of two members movable toward and from each other, a master wedge movable with said members and engaging and, when moved to the braking position, moving said members from each other, means for moving said master wedge to the braking position, two auxiliary wedges respectively engaged by and movable to the braking position when said members are moved from each other, and means actuated by said auxiliary wedges when moved to the braking position for moving said connecting means respectively to the braking position.

2. In a brake mechanism having four brakes for four wheels and having four connecting means for respectively setting said brakes, the combination with said connecting means, of three pairs of members, the members of each pair being movable from each other to a braking position, means actuated by one pair of said members, when moved to the braking position for respectively moving two of said connecting means to the braking position, means actuated by another of said pairs, when moved to the braking position, for moving respectively the other two connecting means to the braking position, a master wedge engaging and movable with the third pair of members, and, when moved to the braking position moving said members of said third pair to the braking position, two auxiliary wedges respectively movable by said members of said third pair to the braking position, and respectively engaging and movable with the members of the other two pairs and, when moved to the braking position moving the members so engaged to the braking position, and means for moving said master wedge to the braking position.

3. In a brake mechanism having two brakes and two connecting means for respectively setting said brakes, the combination with said connecting means, of two slidable members movable from each other to a braking position, means actuated by said members when so moved for moving said connecting means to the braking position, a longitudinally slidable wedge operating member movable to the braking position, means for so moving said operating member, and a wedge engaged by and movable in one direction by said operating member when the latter moves to the braking position and slidable against said operating member transversely to said direction and being intermediate of and engaging slidably said two slidable members, and, when moved to the braking position forcing said two slidable members to the braking position.

ALVIN B. BRUCE.